(12) United States Patent
Gautheron

(10) Patent No.: US 10,358,302 B2
(45) Date of Patent: Jul. 23, 2019

(54) SUPPLYING OF CUTOUTS

(71) Applicant: C.E.R.M.E.X. Constructions Etudes et Recherches de Materiels pour l'Emballage d'Expedition, Corcelles les Citeaux (FR)

(72) Inventor: Anthony Gautheron, Corcelles les Citeaux (FR)

(73) Assignee: C.E.R.M.E.X. CONSTRUCTIONS ETUDES ET RECHERCHES DE MATERIELS POUR L'EMBALLAGE D'EXPEDITION, Corcelles les Citeaux (FR)

( * ) Notice: Subject to any disclaimer, the term of this patent is extended or adjusted under 35 U.S.C. 154(b) by 0 days.

(21) Appl. No.: 15/624,902

(22) Filed: Jun. 16, 2017

(65) Prior Publication Data

US 2017/0362042 A1 Dec. 21, 2017

(30) Foreign Application Priority Data

Jun. 18, 2016 (FR) ...................................... 16 00970

(51) Int. Cl.
| | |
|---|---|
| *B65H 3/44* | (2006.01) |
| *B65B 43/14* | (2006.01) |
| *B65H 1/26* | (2006.01) |
| *B65G 59/02* | (2006.01) |

(Continued)

(52) U.S. Cl.
CPC .............. *B65G 59/02* (2013.01); *B65H 1/30* (2013.01); *B65H 5/006* (2013.01); *B65H 2301/4223* (2013.01); *B65H 2301/4224* (2013.01); *B65H 2301/4228* (2013.01); *B65H 2301/42242* (2013.01); *B65H 2301/42256* (2013.01); *B65H 2555/31* (2013.01); *B65H 2701/176* (2013.01); *Y10T 16/90* (2015.01)

(58) Field of Classification Search
CPC ...... B65H 45/1015; B65H 2301/42242; B65H 2301/42162; B65H 31/3045; Y10T 16/90; B65G 59/02
See application file for complete search history.

(56) References Cited

U.S. PATENT DOCUMENTS 1,784,707 A * 12/1930 Porter ...................... B43M 9/00
16/403
2,043,611 A * 6/1936 Ellinwood ............... B43M 9/00
16/403

(Continued)

FOREIGN PATENT DOCUMENTS

| EP | 1826164 A1 | 8/2007 |
|---|---|---|
| EP | 2899149 A1 | 7/2015 |

OTHER PUBLICATIONS

FR Search Report, dated Feb. 20, 2017, from corresponding FR application.

*Primary Examiner* — Gregory W Adams
(74) *Attorney, Agent, or Firm* — Young & Thompson

(57) ABSTRACT

Disclosed is a supply device for supplying cutouts to a machine from an inventory configured in several adjacent stacks of cutouts; the device includes a manipulator to transfer, by batch, the cutouts from the inventory to the machine. This device further includes a pressing unit to compress at least one stack that is adjacent to the one from which the manipulator removes cutouts. Also disclosed is a corresponding method.

13 Claims, 9 Drawing Sheets

(51) Int. Cl.
 *B65H 1/30* (2006.01)
 *B65H 5/00* (2006.01)

(56) References Cited

U.S. PATENT DOCUMENTS

| | | | | |
|---|---|---|---|---|
| 2,062,242 A | * | 11/1936 | Voosen | B42F 17/02 16/403 |
| 2,814,274 A | * | 11/1957 | Diamond | B43M 9/00 16/403 |
| 2,814,275 A | * | 11/1957 | Diamond | B43M 9/00 16/403 |
| 2,933,314 A | * | 4/1960 | Stobb | B65H 31/18 100/215 |
| 3,739,924 A | * | 6/1973 | Stobb | B65H 29/18 271/213 |
| 3,880,308 A | * | 4/1975 | Stobb | B65G 1/04 414/799 |
| 4,189,136 A | * | 2/1980 | Robinette | B65B 43/14 271/12 |
| 4,551,053 A | | 11/1985 | Ishibashi | |
| 4,671,723 A | * | 6/1987 | Feldkamper | B65H 1/00 271/147 |
| 4,911,608 A | | 3/1990 | Krappitz et al. | |
| 5,279,536 A | * | 1/1994 | Abreu | B65H 45/1015 226/108 |
| 5,380,147 A | | 1/1995 | Hess et al. | |
| 5,413,449 A | * | 5/1995 | Schoenherr | B41J 11/58 414/343 |
| 5,692,999 A | * | 12/1997 | Crowley | B62B 1/08 108/1 |
| 6,332,750 B1 | | 12/2001 | Donner et al. | |
| 8,822,934 B2 | * | 9/2014 | Sayeh | A61N 5/10 250/363.1 |
| 2002/0154986 A1 | | 10/2002 | Leblanc et al. | |
| 2013/0108408 A1 | * | 5/2013 | Saison | B65H 3/0816 414/797 |
| 2015/0187159 A1 | * | 7/2015 | Yin | B65H 3/063 271/10.09 |

\* cited by examiner

SUPPLYING OF CUTOUTS

BACKGROUND OF THE INVENTION

Field of the Invention

This invention relates to the field of the packaging of products, and has as its object, on the one hand, a cutout transfer device, and, on the other hand, a method using this device.

Description of the Related Art

In this field, machines are used that create cardboard containers by folding flat cardboard sheets, in a step commonly called "box forming." The machine can comprise peripheral steps of this box forming: grouping of the products to be deposited there, orientation, placement, box closing, etc.

This type of machine generally has a storage area in which the cardboard sheets are received against one another, often oriented approximately vertically. They are then used one after the other to form, in each cycle, a cardboard box.

A machine with box forming thus has a storage area from which the cutouts are pulled one after the other. This storage area ensures the autonomy of the machine and can contain a large number of cutouts.

It is advantageous to supply this storage area with cutouts automatically. Thus, robotic solutions exist, which cyclically grasp several cardboard cutouts simultaneously and place them in the storage area. Initially, the cutouts are found on a pallet, superposed on each other in stacks beside one another on said pallet.

EP2899149, U.S. Pat. Nos. 4,551,053, 6,332,750, or even US2002154986 propose, for example, equipment that grasps a batch of cutouts so as to bring them into the storage area of a machine.

A problem can occur when the cutouts are initially not interconnected. They are then able to be moved parallel to their plane, until eventually disturbing an adjacent stack, by being inserted there, for example. The cardboard cutouts are thus interspersed possibly into an adjacent column. Further, it is understood that the cutouts from one stack can touch those of another stack and destabilize the latter when they are picked up, i.e., pull the other stack when they are moved. Generally, the insertion, even very slight, of one cutout between two cutouts of another stack can bring about a disturbance of a stack during the movement of cutouts from another stack. In addition, the traditional tools for grasping a batch of loose cutouts generally are based on a gripper that touches the stack of cutouts, indeed is inserted between two successive cutouts. This insertion can cause the cutouts to overlap as described above.

BRIEF SUMMARY OF THE INVENTION

In this context, one of the objects of the invention is to avoid disturbing the stacking of cutouts within a stack when cutouts are removed from another stack, and this in a simple, reliable, and inexpensive way.

To do this, the invention proposes exerting a compressive force that stabilizes the cutouts in the area of at least one of the stacks beside the one from which the cutouts are removed.

The invention also has as its object a supply device for supplying cutouts to a machine from an inventory configured in several adjacent stacks of cutouts, the device comprising a manipulator to transfer, by batch, the cutouts from the inventory to the machine.

This device is characterized in that it further comprises a pressing means to compress at least one stack that is adjacent to the one from which the manipulator removes cutouts.

The invention also has as its object a method used by this device, namely a method of supplying cutouts to a machine, from an inventory in the form of side-by-side stacks, of one or more layers, comprising a step consisting in grasping a batch of cutouts, using a manipulator, from one of said stacks, then in placing it in the machine.

This process is characterized in that it further comprises a step consisting essentially in exerting a compressive force on a stack that is located beside the one from which the batch is grasped.

BRIEF DESCRIPTION OF THE DRAWINGS

The invention will be better understood as a result of the description below, which is based on possible embodiments, explained in a manner that is illustrative and that is in no way limiting, with reference to the accompanying figures in which.

DETAILED DESCRIPTION OF THE PREFERRED EMDODIMENTS

Figure 1:
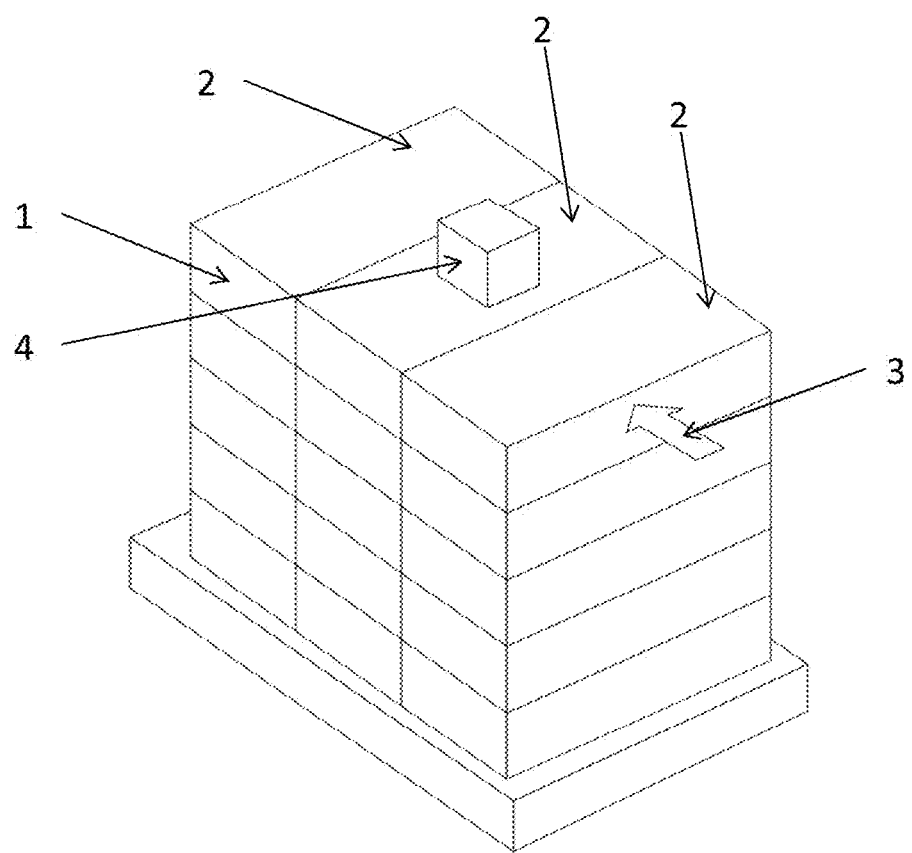
FIG. 1 shows a pallet on which several columns of cutouts rest, beside one another, the columns being made of several successive sections.

The invention, first of all, therefore has as its object a supply device for supplying cutouts 1 to a machine from an inventory configured in several adjacent stacks 2 of cutouts 1, the device comprising a manipulator 3 to transfer, by batch, the cutouts 1 from the inventory to the machine.

In the inventory from which they are pulled, the cutouts 1 are therefore superposed in the form of stacks 2 on a pallet.

A stack 2 can extend from the pallet to the highest cutout 1, and can thus be formed from all of the cutouts 1 that are found in the extension of the first, lowest, on the pallet support.

In certain other cases, the cutouts 1 are organized in superposed layers, each layer comprising several shorter stacks 2, beside one another. For example, a separator from the surface area of the pallet can extend between two successive layers. Thus, it is necessary to transfer the stacks 2 of the same layer one after the other, before transferring the stacks 2 of the lower layer one after the other, etc.

The supply device then serves to feed the machine with cutouts 1 in a cyclical manner, with several cutouts 1 in each cycle. The manipulator 3 is therefore equipped with a head that can be moved between the inventory, in the vertical extension of the pallet, and the receiving storage area of the machine.

The cutouts 1 are loose in relation to one another, which can cause one of them to be moved slightly toward a nearby stack 2. Furthermore, it is understood that for reasons of compactness, the stacks 2 are close to one another on the pallet. During the operation of the manipulator 3, the cutouts 1 that it handles can touch an adjacent stack 2 and, since the cutouts 1 that form the latter are loose and create a stack 2 that can be slightly unstable, the adjacent stack 2 can fall, or simply be disturbed, making the subsequent grasping of its cutouts 1 difficult, even impossible.

Thus, according to the invention, the device further comprises a pressing means 4 to compress at least one stack 2 adjacent to the one from which the manipulator 3 removes cutouts 1. These cutouts 1, which form the upper part of the stack 2, are removed from it to be brought to the storage area of the machine.

This pressing means 4 serves to stabilize at least one stack 2 that is against the one from which the manipulator 3 removes cutouts 1. One of the objects is to avoid removing cutouts 1 from one stack 2 that is followed by disturbances on an adjacent stack 2.

This pressing means 4 therefore exerts a force in the axis of the stack 2, i.e., perpendicular to the plane of the cutouts 1. Generally, the cutouts 1 are horizontal, and the stacks 2 therefore extend in a vertical axis. The force exerted by the pressing means 4 therefore has a vertical component. Although there are many ways of exerting such a vertical force, a simple way is to place a weight on top of the at least one stack 2. The pressing means 4 can take the form of a weight or other element of sufficient weight.

This force should preferably reduce the vertical space between the edges of two successive cutouts 1, and/or increase the horizontal flat friction between two successive cutouts 1.

Thus, in certain embodiments, the pressing means 4 comprises a movable block 5, whose weight is exerted on the stack 2 on which it is placed. The block 5 is therefore moved to be placed on the determined stack 2, as a function of the stack 2 from which the manipulator 3 is going to remove cutouts 1. The block 5 preferably extends over one part only of the surface area of a cutout 1. In other words, the block 5 rests on top of the stack 2, pressing on the uppermost cutout 1 of the stack 2. The pressing means 4 can comprise several such blocks 5, each being able to be placed on a stack 2 beside the one handled by the manipulator 3, which normally handles a stack 2 from the side. The weight of a block 5 is then simply used to exert the vertical force required to stabilize the stack 2 under it.

The block 5 is therefore preferably positioned on top of the at least one stack 2 that must be stabilized. The at least one block 5 is moved to be placed on the stack 2 that requires it. A simple solution to move the block 5 can then be to move it using the manipulator 3, the latter being necessarily present to move the cutouts. Further, since the manipulator 3 transfers on each cycle a batch of several cutouts 1, it is possible for it to move the block 5 itself to the necessary place at the appropriate time, without impacting the processing rate of the boxing or box-forming machine.

Thus, according to an additional possible characteristic, the manipulator 3 and the at least one block 5 are suited to work together so that the manipulator 3 for transferring batches of cutouts 1 also ensures the grasping, the movement and the placement of said block 5. The manipulator 3 therefore can grasp and move not only groups of cutouts 1 but also at least one block 5. It is conceivable that the same element of the gripper type is used both to grasp a batch of superposed cutouts 1 and a block 5. The block can have a rectangular parallelepiped, cube or other shape, with flat, parallel or perpendicular faces.

In certain embodiments, the manipulator 3 is equipped with a vise-forming gripper to grasp the block 5, the latter further being in particular equipped with particularly rough surfaces, to ensure thus the holding of the block 5 in said gripper. The same gripper can then be used to hold a batch of cutouts 1. The batch that is grasped can form the entirety of the cutouts 1 in a layer, from a separator that delimits, in the vertical direction, two superposed stacks 2.

According to an additional possible characteristic, the device has a receptacle 6, which can receive the block 5 when it is not resting on a stack 2. The receptacle 6 and the block 5 are particularly suited to exhibit a complementarity that forms a guiding ensuring a preferred holding of the block 5 in the receptacle 6 when said block 5 is positioned there in a predefined position.

The receptacle 6 also comprises in particular, in certain cases, a detector 7 that identifies the presence of the block 5 in the receptacle 6, even its position in line with the predefined position.

For example, the guiding can ensure that the block 5 goes down correctly and completely into the receptacle 6 with a shape at least partially complementary only if it is in a certain spatial orientation. The detector 7, of the ultrasound detector type or the like, can then be positioned so as to detect the block 5 only if it is completely engaged in the receptacle 6, at the bottom of the stop.

This guiding is particularly useful provided that the manipulator 3 must be able to grasp the block 5 from the receptacle 6 in a stable and robust manner. The receptacle 6 can comprise a horizontal plate, which can accommodate the block 5 on it. The block 5 and the receptacle 6 can have a complementarity of force ensuring a particular positioning provided that the block 5 is in a particular orientation.

As has already been mentioned, the block 5 is normally, except for situations of extraordinary stopping, brought into the receptacle 6 or is removed from it by the manipulator 3 directly, which therefore controls the spatial orientation thereof.

The invention also has as its object a method using the device as described above, namely a method of supplying cutouts 1 to a machine, from an inventory in the form of side-by-side stacks 2, of one or more layers, comprising a step consisting in grasping, using a manipulator 3, a batch of cutouts 1 from one of said stacks 2, and then in placing it in the machine, particularly in a receiving storage area that it has.

The batch of cutouts 1 grasped and brought to the storage area of the machine extends from the uppermost cutout 1 of the stack 2. The batch can thus consist of the upper part of a stack 2, extending optionally from the pallet support, or from a separator that defines a layer. The batch can also consist of the entire stack 2 itself, in the case where, for example, the inventory of cutouts is made of several successive layers, delimited by horizontal separators, each layer comprising several side-by-side stacks 2.

According to the invention, the method further comprises a step consisting essentially in exerting a compressive force on a stack 2 that is located beside the one from which the batch is grasped, said compressive force aiming in particular to tighten the superposed cutouts 1 against one another in the stack 2 concerned, said adjacent stack 2.

This compressive force therefore has a main component that is perpendicular to the plane of cutouts 1 themselves.

On the pallet, seen from above, the stacks 2 are arranged beside one another along one of the two rectangular-shaped pallet support edges. The manipulator approaches the stack 2 at an insertion direction. It is understood that at least one edge of the stack 2 from which the cutouts 1 are removed must therefore be disengaged, so that it comes against it from the side. The at least one stack 2 on top of which the block 5 is placed is therefore found against the stack 2 that the manipulator 3 is handling in the area of an edge other than that which is open for the access of the manipulator 3.

According to an additional possible characteristic, the compressive force is obtained as a result of the weight of a mobile block 5 that is positioned on the top of the stack 2. This block 5 is therefore autonomous and moved when needed onto the stack 2 to be stabilized.

According to an additional possible characteristic, the block 5 is placed on or taken from a receptacle 6 that receives the block 5 when it is not on a stack 2, located outside of an area that accommodates the stacks 2 to be handled. The cutouts 1 to be handled are normally placed on a support pallet, which therefore forms the low part of the inventory that is found in the zone accommodating the stacks 2. The block 5 can be found either on a stack 2 to be stabilized, or housed in a receptacle 6. The receptacle 6 therefore is part of the supply device, whereas the pallet support and the possible cutouts 1 that it contains change with each production. It is actually understood that a production is repeated, barring stops during production, for several successive pallets. Each pallet is unloaded to feed its cutouts 1 to the storage area. It can be envisaged to handle successively layers that each form a certain total stacking height. Once the layer is handled for each stack 2, the layer from the level below is handled, and so on.

Thus, in possible embodiments, the cutouts 1 are transferred by layer formed by the similar batches at the top of the successively handled stacks 2, the block 5 being placed within the receptacle 6 before the grasping of the last batch of the layer and then being taken there before the grasping of the first batch of the next layer.

Finally, in advantageous configurations, the movement of the mobile block 5 is performed by the manipulator 3. The same robotic means, or manipulator 3, therefore has the function not only to move the cutouts into the storage area but also to manage the position of the at least one block 5, and therefore to grasp it, move it, place it, orient it, etc.

In the embodiment illustrated in the accompanying figures, the machine in question is of the boxing-machine type. Such a machine comprises a cardboard-box-forming module. This forming module therefore uses cardboard sheets and folds them along predefined folding lines to obtain cardboard boxes.

The operation of this machine is cyclical, so that it uses one cutout of cardboards after the other. Of course, the invention is applicable to other machine types, such as, for example, machines whose sole function is the forming of a cardboard box.

The invention comprises a solution for feeding such a machine with cardboard cutouts, whose subsequent folding will result in obtaining a cardboard container. The machine has a receiving storage area in which numerous cutouts can be received. The machine then successively consumes one cutout after the other to obtain said boxes. The cutouts 1 are loaded into the storage area of this machine using a supply device that will be described.

Initially, the cutouts 1 are found stacked on one another in an area outside of the machine. The supply device grasps the cutouts 1 and brings them into the storage area for feeding the machine. The cutout 1 thus assumes the shape of a flat cardboard sheet optionally having preferential folding lines, as well as optionally indentations from its perimeter. With each operating cycle, the machine thus removes one cutout 1 from its storage area and folds it so as to obtain the cardboard container. The supply device functions to feed the storage area with cutouts 1. These cutouts 1 are initially found outside of the machine in an initial receiving area.

In this initial receiving area, the cutouts 1 are stacked on one another on a pallet generally made of wood that is placed on the ground. Several stacks 2 extend from the pallet and are found beside one another. The successive cutouts can be separated by a separator that is common across the pallet, thus defining each time a layer that comprises several stacks 2 beside one another.

Preferably, at the beginning of the cycle, the stacks 2 each have the same height. The supply device then grasps, with each cycle for supplying the storage area of the machine, several cutouts that form the upper part of one of the stacks 2, even the entire stack 2. Within a stack 2, the cutouts 1 normally are not connected to one another. A problem therefore can occur, which is the possible sliding of one or more cutouts 1 from a stack 2 toward another stack 2 located alongside. It is understood that the cutouts 1 have an overall rectangular shape and that the stacks 2 thus obtained touch one another in the area of a vertical flat edge that has rough spots that form sticking points.

The supply device comprises a manipulator 3 preferably in the form of a robotic actuator. This manipulator 3 is able to move between, on the one hand, the initial receiving area in which the cutouts 1 are found, up to the area of the storage area of the machine. The range of the movement of this manipulator 3 is such that it allows it to reach these two areas. The manipulator 3 preferably has a gripping head at its free end. This head preferably has the form of a gripper or vise as a result of which numerous superposed cutouts 1 can be grasped and then placed in the storage area of the machine. Thus, the head of the manipulator 3 can navigate between the area where the pallet is found and the stacks 2 of cutouts 1 and the storage area. With each operating cycle of the manipulator 3, the supply device brings to the machine a group or a batch of cutouts 1.

In other words, the manipulator 3 with each operating cycle takes an upper part of one of the stacks 2 and places it in the storage area of the machine. The manipulator 3 repeats this operation successively. Thus, in a conventional operating cycle, the manipulator 3 grasps the upper end part of one of the stacks 2, places it in the storage area, and then grasps the end of another stack 2 and so on. Thus, with each transfer cycle performed by the manipulator 3 from the pallet area to the storage area, it is a batch of a certain thickness that is transferred from the initial receiving area to the storage area, this batch being able to form the entire stack 2 in the cases of successive separators defining layers of several short stacks 2. It is understood that a complete cycle can then consist in handling successively the same height of each stack 2 until having reduced in similar fashion the height of each of them.

The operation is thus done by feeding the machine with one overall cycle during which an entire layer of cutouts 1 is fed into the machine. This layer is formed in the upper part of each of the stacks 2. On the pallet, the cutouts 1 extend preferably horizontally, the stacks 2 then extending, for their part, in a vertical axis. The head of the manipulator 3, so as to grasp an end part of one of the stacks 2, performs—at least at the end of its movement—a movement that is itself also horizontal. It is then possible that the cutouts 1, which are in the stack 2 from which the manipulator 3 is going to grasp the upper end, move slightly horizontally and interfere with the adjacent stack, in the direction of the movement of the manipulator 3.

To avoid excessive disturbances on this adjacent stack 2, the invention proposes exerting on the latter a slight force that will make it possible to press the cutouts 1 that constitute it against one another. Thus, the manipulator 3 grasps a group of cutouts 1 that form the upper end part of a stack that is termed "active stack." The stack 2 known as the adjacent stack is a stack that is located beside the active stack, optionally in the direction of the movement of the manipulator 3. So as to stabilize this adjacent stack, the invention proposes exerting from its upper edge a vertical force oriented downward. Of course, the adjacent stack, which receives the block 5, can also be found elsewhere. Generally, the adjacent stack is normally found against the active stack 2, a vertical face of one being against a vertical face of the other.

Generally, this vertical force oriented downward, which has the effect of tightening the cutouts 1 that constitute this stack 2 against one another vertically, can be exerted on at least one of the stacks 2 that has an edge against the stack 2 from which the manipulator 3 grasps the upper part. In practice, the stack 2 on which the vertical force will be exerted can be found to the left, to the right, behind, in front relative to the active stack 2. The adjacent stack 2 does not undergo this vertical force.

The tightening means is preferably selective, which means that it compresses at least one particular stack 2 at a particular moment. In alternative cases, it can be envisaged that more than one other stack 2 is thus compressed, even that each of the stacks 2 other than the active stack 2 undergoes this vertical force. It is understood that this vertical force for holding the stack 2 in position must be exerted at least when the manipulator 3 deals with the upper part of another stack 2.

In possible embodiments, this means of tightening or of pressing can be an articulated system. In particularly simple embodiments, as illustrated in the accompanying figures, the pressing means rests essentially on a block 5 whose weight creates the vertical force, from the top of the stack 2 in question. Thus, to obtain the desired compressive force, the supply device provides for placing on the top of the stack 2 to be secured a block 5 whose weight is such that it will exert enough force to hold the cutouts 1 vertically against one another. This block 5 therefore compresses the stack 2 at least slightly.

This action, however, is not necessarily associated with a significant dimensional variation of the vertical stack 2. Further, the action created by the presence of the block 5 is necessary only on a height of the adjacent stack 2 that corresponds approximately to the height of the batch of cutouts 1 that the manipulator 3 removes from the active stack 2. The vertical force exerted by this block 5 therefore has the effect of creating enough friction in a horizontal plane between the successive cutouts 1, which avoids any risk during the handling of the active stack 2. Thus, any disturbance of the adjacent stack 2 is avoided, since the cutouts 1 that constitute it will not be moved by the movement of the batch removed from the upper part of the active stack 2.

The block 5, or pressing means, is preferably an independent element with a flat lower surface. This block 5 is free in position and can be placed anywhere. In other words, it involves a counterweight or weight that can be placed on nearly any horizontal surface. It is understood that in certain installations, the supply device can comprise an actuator whose main function is the movement of this block 5 and its positioning on the stack 2 to be stabilized. Nevertheless, it is also understood that the supply device has a manipulator 3 that, considering its essential function of transferring cutouts 1, has the geometric range necessary to be moved above the area in which the cutouts 1 are found.

Thus, it is advantageous to use the existing manipulator 3, whose essential function is the transfer of the cutouts 1, so that it moves the block 5 itself. Thus, a supply device is obtained in which one and the same means ensures, on the one hand, the movement of the cutouts 1 to the storage area and, on the other hand, the movement of the block 5 to the top of the adjacent stack 2 to be secured. Generally, the supply device can comprise several blocks 5 that are positioned on either one and the same stack 2, or several, even a different stack 2 for each of them. The manipulator 3 therefore ensures the positioning of this at least one block 5 at the right place and at the right time relative to the grasping of the cutouts 1. The manipulator 3 thus has a gripping head using which it can grasp a batch of cutouts 1, and it is also equipped with an element of the gripping type to grasp the block 5. It will be noted that it can involve the same gripper.

The supply device preferably comprises a frame to which the manipulator 3 is attached. The pallet on which the stacks 2 are found then is placed beside this frame. The supply device comprises a receptacle 6 to receive the at least one block 5 when it is not placed on top of a stack 2. The advantage of a defined-position receptacle 6 is that the robotic solution of the manipulator 3 can operate with a piece of information that is representative of the position by default of the block 5. Actually, from the moment that the block 5 is not on a stack 2, it must be found in the receptacle 6. The latter thus preferably has a horizontal receiving surface on which the block 5 can be placed. This surface can be carried by a plate that extends in an overhanging manner from the frame of the supply device. A detector 7 can be provided so as to detect the presence or the absence of at least one block 5 in the area of the receptacle 6.

For example, the shape of the block 5 and that of the receptacle 6 can be such that they have a particular complementarity in a predefined position so as to form a guiding function. Thus, a position or a complete accommodation of the block 5 in the receptacle 6 is possible only if the block 5 is found in a certain orientation. Such a guiding solution relies on, for example, a set of grooves, ribs, or other convex and/or concave elements. When the block 5 is positioned in the receptacle 6 with the predefined orientation, it attains a position in which it can be detected by the detector 7. For example, an insertion of greater magnitude of the block 5 in the receptacle 6 can be envisaged provided that the block 5 is in the orientation that corresponds to this guiding.

The receptacle 6 is preferably outside of the area of the pallet. The fact of having a receptacle 6 that is not found in the vertical extension of a pallet makes it possible for the manipulator 3 to navigate freely over the entire surface of the pallet, without risking colliding with the at least one block 5. In alternative embodiments, the manipulator 3 can itself be equipped with a detection solution, for example with a laser. The manipulator 3 then sweeps the area of the receptacle 6 and can detect whether the block 5 is found there and what its position is exactly. This alternative is conceivable in the cases where the manipulator 3 is already equipped with such a detector, for example to measure precisely the height of each of the stacks 2, the former being able to be different, in particular when a cycle starts with a pallet on which stacks 2 are found that have already been partially used in a prior production.

A cycle for transfer of a batch of cutouts 1 will now be described. In a first step, the manipulator 3 is going to search for the block 5 where it is found. Its position is preferably stored in memory by a centralized control unit of the supply device. The block 5 is found either on one of the stacks 2, or in the receptacle 6. This first step that consists in searching for the block 5 can, of course, be performed in a different manner if it involves, as will be described below, the first batch of a horizontal layer, even the first batch after an emergency stop or an anomaly. Once the manipulator 3 has grasped the block 5 where it is found, it moves it to place it on a stack 2 that is found beside the stack 2 from which it is going to take the upper end to bring it into the storage area of the machine.

As has been specified, the cutouts 1 have an essentially rectangular shape. The active stack 2 and the adjacent stack 2, on top of which the block 5 is placed, are therefore touching each time at an edge of these cutouts 1, which together form a vertical wall. Alternatively, if the future batch to be transferred is the last batch of the layer, the manipulator 3 then places the block 5 in the receptacle 6. Actually, since it involves the last batch of the same horizontal layer, it is understood that in the horizontal extension of the batch to be handled, there is no cutout 1 that can be moved during the action of the manipulator 3 or that can undergo interferences or disturbances because of the transfers. Once the block 5 is placed in the right spot, the manipulator 3 is going to grasp a batch of cutouts 1, this batch forming a part of the upper end of the stack 2. As has already been explained, the active stack 2 is found between the manipulator 3 and the stack 2 on which the block 5 is found in the direction of the movement of the manipulator 3 when it is picking up cutouts 1.

Once the batch is grasped, it remains simply for the manipulator 3 to move this batch until it is brought to the machine and then to release the cutouts 1 there. Preferably, after having handled a batch in a stack 2, the process is continued by the handling of a batch with the same thickness from the top of a stack 2 located beside the one that has just been handled. It is understood that the manipulator 3 proceeds by removing the upper part of a stack 2 that is found on the periphery of the profile formed by the group of cutouts 1 that are found on the pallet. The superposed cutouts 1 on the pallet are preferably transferred into the machine by layer. Thus, in a first step, the supply device feeds into the machine a batch of cutouts 1 that forms the upper part of a certain height for one of the stacks 2.

The next cycle consists essentially in removing the same end part forming a batch from a stack 2 beside the one previously handled. This cycle is repeated until all of the stacks 2 have the same height. Once all of the stacks have the same height, it is understood that the supply device can begin the handling of a lower-level layer. Each layer corresponds in vertical dimension terms to the height of a batch that is removed from each of the stacks 2. When the supply device reaches the last batch of a layer to be handled, the block 5 is first placed in the receptacle 6. In other words, the last batch of a layer is handled without the block 5 being used as a pressing means from the upper end of another stack 2.

The method is similar when the batch is formed by the entire stack, in the case of stacks 2 placed on separators covering the entire surface of the pallet.

The configurations for positioning cutouts 1 on a pallet are varied. Thus, FIG. 1 shows a pallet on which three stacks 2 are found beside one another. FIG. 1 shows that the supply device will feed the machine with five successive cycles, one horizontal layer being handled in its entirety during each cycle. FIG. 1 shows that the supply device handles a group of cutouts 1 in the upper part of the stack 2. During this handling, the block 5 is found on the next stack 2 in the direction of the manipulator 3.

Figure 2:
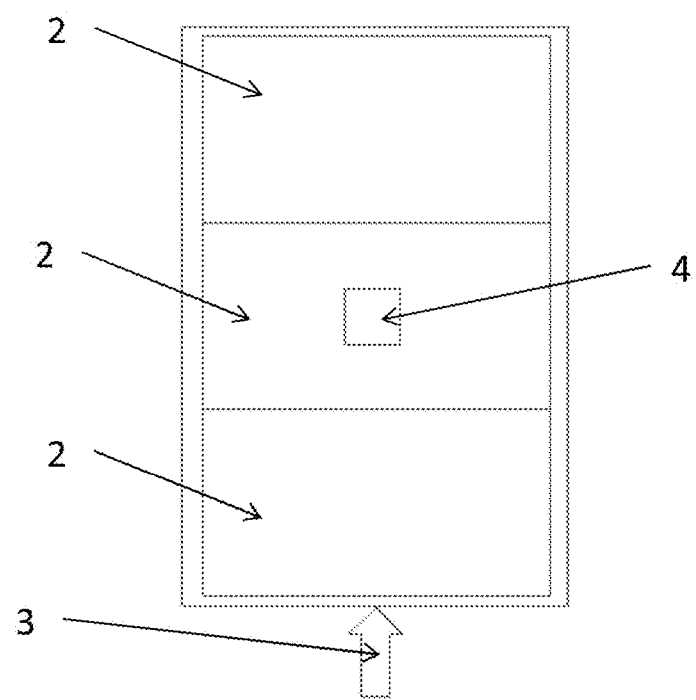
FIG. 2 shows a top view of it, with a weight placed on the column in the middle to stabilize it when a batch of cutouts is removed from the stack at the bottom of the figure.

FIG. 2 illustrates this same step seen from above.

Figure 3:
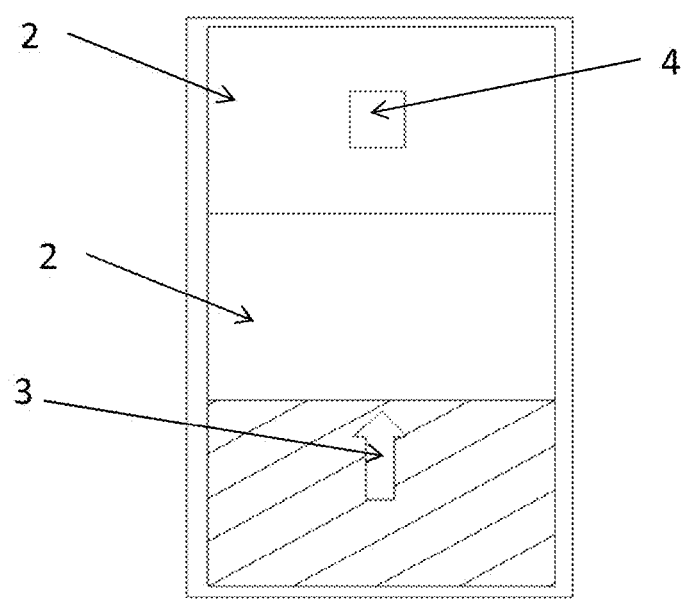
FIG. 3 shows the following step, where the weight rests on the column at the top of the figure, when it is the column in the middle from which the cutouts are transferred.

FIG. 3 shows the handling of the batch of the same layer in the stack 2 in the middle. During this step, the block 5 is found on the third stack 2.

Figure 4:
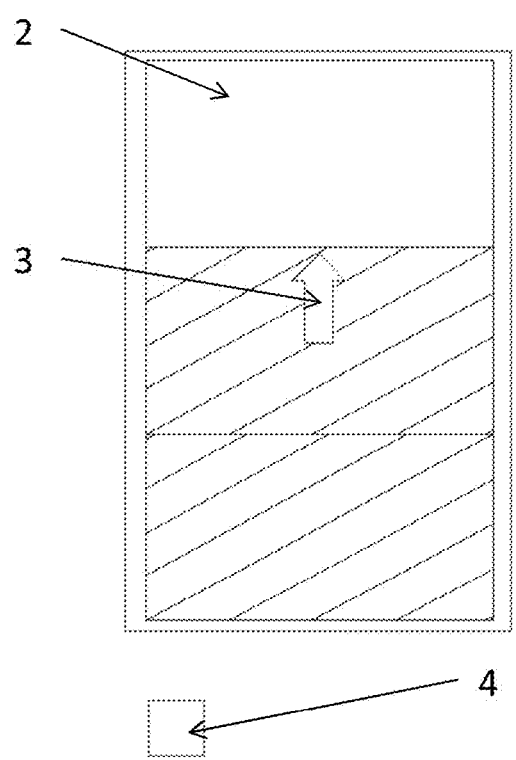
FIG. 4 shows the step for removal of the last batch from the same layer on the highest stack, with the weight on standby outside of the pallet area.

Finally, FIG. 4 shows the handling by the manipulator 3 of the last batch of the layer, during which the block 5 is found in the receptacle 6.

Figure 5:
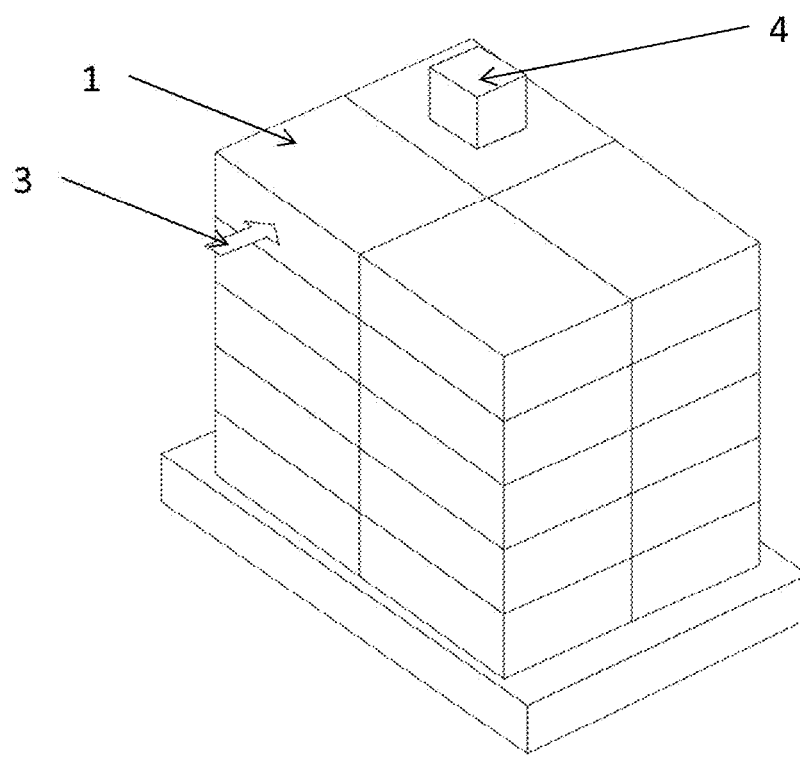
FIGS. 5 to 9 show an identical method for removal of a layer of cutouts, with four stacks.

FIG. 5 shows a configuration in which the cutouts 1 are organized in four stacks 2 arranged in a rectangle. Each stack 2 thus has two of its edges in contact with another stack 2. During the first step of the cycle during which the first of the five layers will be transferred, the manipulator 3 arrives to grasp the batch on top at the left. The block 5 rests on the stack 2 in the extension of the movement of the manipulator 3.

Figure 6:
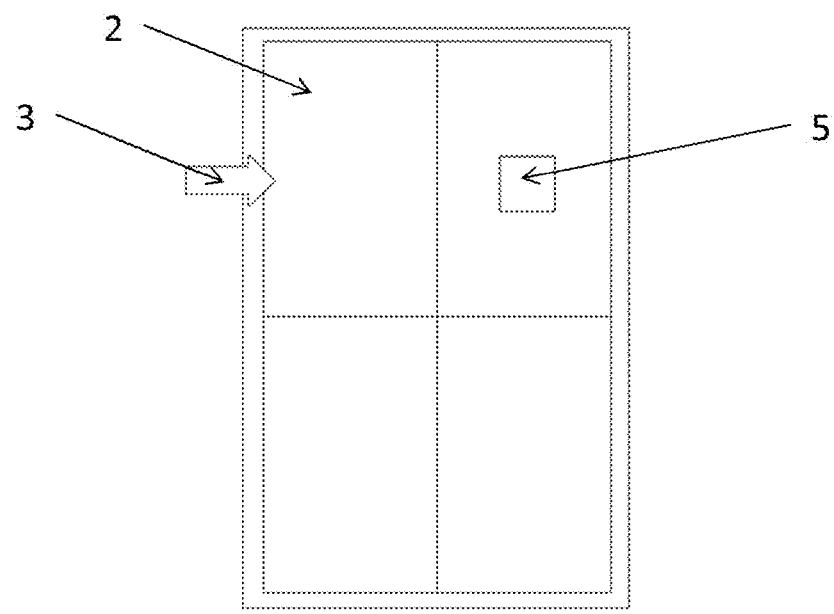

FIG. 6 is a view from above.

Figure 7:
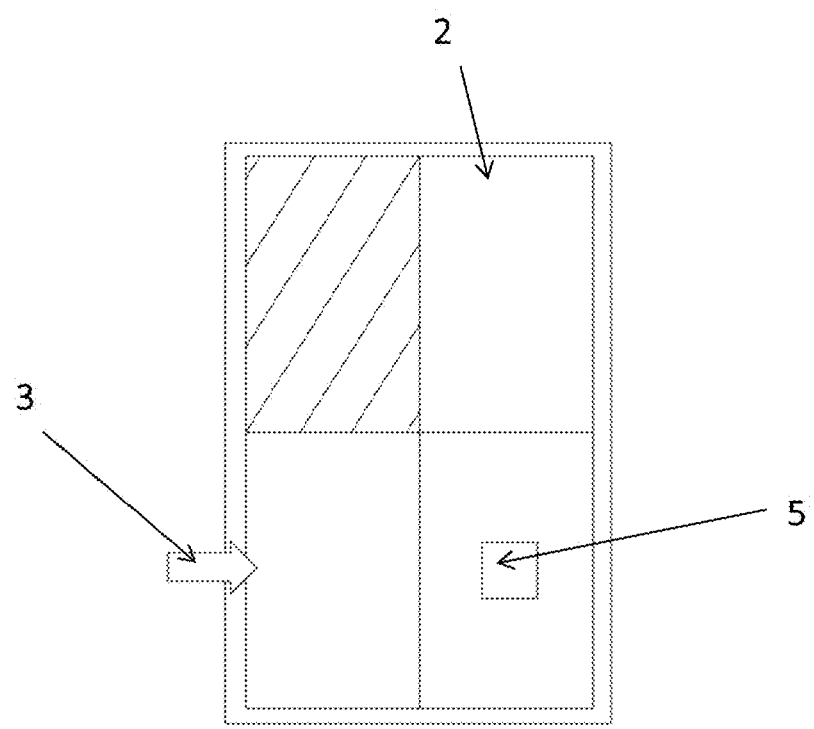
Figure 8:
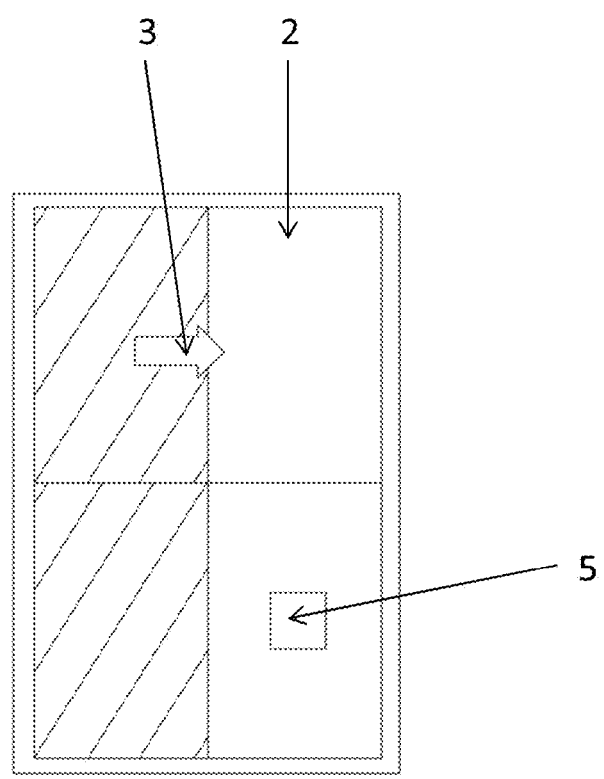
Figure 9:
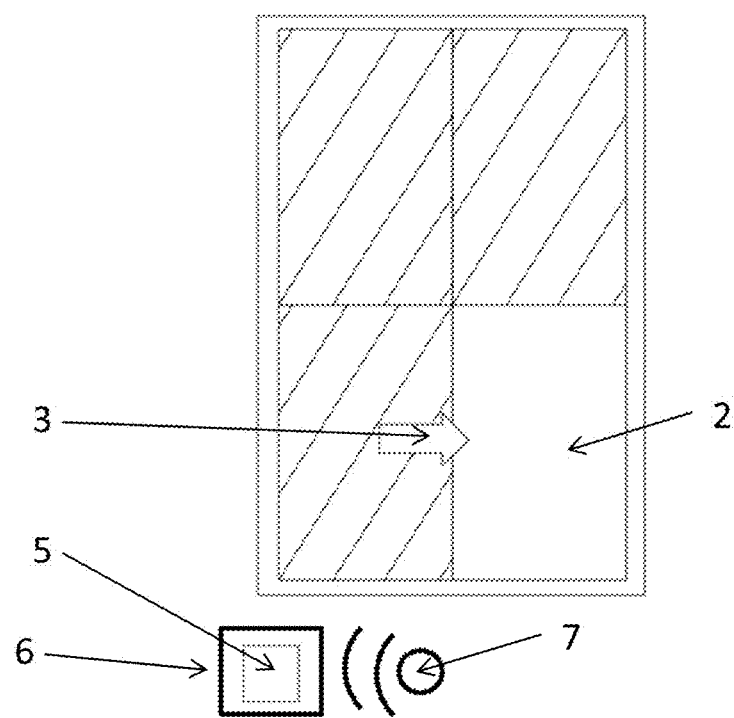

FIGS. 7 to 9 show the rest of the method, the cross-hatched parts representing a stack 2 for which the layer being handled during the cycle has already been removed. It will be noted in FIG. 9 that for the last batch to be transferred, the block 5 is found outside of the pallet area, i.e., on the receptacle 6.

Control steps can be provided that ensure for the manipulator 3 that the block 5 is initially found effectively in the area of the receptacle 6. Thus, at the beginning of a production, if it is detected that the block 5 is not found in the receptacle 6, the centralized control unit can halt the operation and require that the operator place the block 5 in the receptacle 6. The robotic manipulator 3 is then driven in place, for reasons of safety.

It will be noted that the block 5 can also be used in particular in the cases where it is possible to have a block 5 for each stack 2 to stabilize each stack 2 when the manipulator 3 performs a cycle during which the exact form of the group of cutouts 1 is sensed and detected by successive contacts. Also, upon the resumption of production after an emergency stop, the presence or not of the block 5 in the receptacle 6 is detected. The feeding cycle is possible only if the block 5 is detected as being present in the receptacle 6. Finally, it will be noted that the supply device can also be used thanks to its centralized control unit without the existence of such a block 5 and therefore without the necessity of incorporating steps for movement of such a block 5. This contributes to the versatility of the supply device.

Finally, so as to guarantee a proper adhesion between the manipulator 3 and the block 5, it is advantageous to provide that the surface against which the grasping gripper of the manipulator 3 is applied has a particularly expanded adhesion so as to avoid any dropping of the block 5.

Generally, two adjacent stacks 2 extend vertically from the same horizontal surface. In other words, two adjacent stacks 2 are as a rule supported by the same horizontal support, generally a pallet or a separator.

A stack 2 of cutouts 1 is formed solely of cutouts 1 stacked on one another. Thus, when a separator is placed between two cutouts 1, the cutout 1 placed below the separator belongs to a first stack 2 and corresponds to the topmost cutout 1 of this stack 2, and the cutout 1 placed above the separator belongs to a second stack 2 and corresponds to the bottommost cutout 1 of this stack 2.

The cutouts 1 belonging to the same stack 2 are placed on one another so that the edges of each cutout 1 are aligned with the edges of the other cutouts 1 of the stack 2. A stack thus has a shape that is approximately of the rectangular parallelepiped type.

As previously indicated, according to certain embodiments, when the pressing means 4 comprises a block 5, the latter can be moved using the manipulator 3, which ensures the movement of the cutouts.

In other embodiments, the block 5 can be moved using a gripping means that is separate from the manipulator 3. Thus, in this case, the supply device comprises a gripping means intended to ensure the movements of the block 5. More specifically, such a gripping means can be dedicated to ensuring the grasping, the movement and the placement of the block 5.

As a result of the invention, it is thus possible to transfer batches of cutouts 1 that are loose in relation to one another, superposed on one another, within a stack 2, and this without risking impairing the stacking of at least one stack 2 located alongside. The solution is inexpensive since it takes advantage of the existence of a robotized manipulator 3 whose primary function is the transfer of the cutouts 1 themselves to ensure also the movement of the block 5.

Although the above description is based on particular embodiments, it in no way limits the scope of the invention, and modifications can be made, particularly by substitution of technical equivalents or by a different combination of all or part of the characteristics developed above.

The invention claimed is:

1. A supply device for supplying cutouts to a machine from an inventory configured in several adjacent stacks of cutouts, the device comprising:
 a manipulator configured to transfer, by batch, from one of the stacks, the cutouts from the inventory to the machine; and
 a pressing system configured to compress at least one other stack that is adjacent to one of the stacks from which the manipulator removes cutouts, the one stack and the other stack being adjacent such that the one stack touches the other stack at a vertical flat edge that is vertical in relation to a horizontal base on which the stacks are disposed, the pressing system comprising a movable block, a weight of the movable block being exerted on the stack on which the movable block is placed.

2. The device according to claim 1, wherein the manipulator and the at least one movable block are configured to work together so that the manipulator configured to transfer batches of cutouts ensures the grasping, the movement, and the placement of said movable block.

3. The device according to claim 2, further comprising a receptacle configured to receive the movable block when the movable block is not resting on a stack.

4. The device according to claim 1, further comprising a receptacle configured to receive the movable block when the movable block is not resting on a stack.

5. The device according to claim 1, wherein the pressing system is configured to compress the other adjacent stack during transfer, by batch, of the cutouts from one of the stacks by the manipulator.

6. A method for supplying cutouts to a machine, from an inventory of side-by-side stacks, of one or more layers, the method comprising:
 a step consisting of grasping, using a manipulator, a batch of cutouts from one of said stacks, and then placing the batch of cutouts in the machine; and
 a step consisting essentially of exerting a compressive force on another stack that is adjacent the one stack from which the batch is grasped, the exerting the compressive force comprising positioning a mobile block on the top of the other stack,
 wherein the one stack and the other stack are adjacent such that the one stack touches the other stack at a vertical flat edge that is vertical in relation to a horizontal base on which the stacks are disposed.

7. The method according to claim 6, wherein the positioning the mobile block comprises placing the mobile block on or taking the mobile block from a receptacle that receives the mobile block when the mobile block is not on the other stack, located outside of an area that accommodates the stacks to be handled.

8. The method according to claim 7, wherein the movement of the mobile block is performed by the manipulator.

9. The method according to claim 7, wherein the cutouts are transferred by layer formed by similar batches at the top of the successively handled stacks, the mobile block being placed in the area of the receptacle before the grasping of the last batch of the layer and then being taken to the area before the grasping of the first batch of the next layer.

10. The method according to claim 9, wherein the movement of the mobile block is performed by the manipulator.

11. The method according to claim 6, wherein the positioning of the mobile block comprises using the manipulator to move the mobile block.

12. The method according to claim 6, wherein a compressing system performs a compressing of the other adjacent stack during the grasping by the manipulator of the batch of cutouts from the one stack.

13. The method according to claim 12, further comprising, after the compressing and the grasping and placing steps, a step of subsequently grasping stacks of a same layer as the one stack and the adjacent stack, before a step of grasping stacks of a lower layer.

* * * * *